(12) United States Patent
Komiyama et al.

(10) Patent No.: US 12,526,513 B2
(45) Date of Patent: Jan. 13, 2026

(54) IMAGING DEVICE, CONTROL METHOD FOR CONTROLLING IMAGING DEVICE, AND STORAGE MEDIUM

(71) Applicant: CANON KABUSHIKI KAISHA, Tokyo (JP)

(72) Inventors: Takahiro Komiyama, Tochigi (JP); Kyouhei Suzuki, Tokyo (JP); Mei Saito, Saitama (JP); Reiko Kakimi, Kanagawa (JP); Hironori Oishi, Kanagawa (JP); Takuya Marumo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 18/754,920

(22) Filed: Jun. 26, 2024

(65) Prior Publication Data

US 2025/0008213 A1    Jan. 2, 2025

(30) Foreign Application Priority Data

Jun. 30, 2023    (JP) ................. 2023-108615

(51) Int. Cl.
*H04N 23/60*    (2023.01)
*H04N 23/61*    (2023.01)
*H04N 23/63*    (2023.01)

(52) U.S. Cl.
CPC ............. *H04N 23/64* (2023.01); *H04N 23/61* (2023.01); *H04N 23/634* (2023.01)

(58) Field of Classification Search
CPC .... H04N 23/69; H04N 23/635; H04N 23/633; H04N 23/64; H04N 23/695; H04N 23/634; H04N 23/632; H04N 23/61

USPC ..................................................... 348/333.04
See application file for complete search history.

(56) References Cited

U.S. PATENT DOCUMENTS

| | | | |
|---|---|---|---|
| 10,652,449 B2* | 5/2020 | Hattori | G06T 7/80 |
| 10,666,864 B2* | 5/2020 | Takahashi | H04N 23/634 |
| 11,159,716 B1* | 10/2021 | Adoni | H04N 1/0044 |
| 11,523,047 B2* | 12/2022 | Yamaguchi | H04N 23/64 |
| 2015/0163457 A1* | 6/2015 | Shimoyama | H04N 23/632 348/77 |
| 2018/0249083 A1* | 8/2018 | Chi | G06F 3/0482 |
| 2019/0089886 A1* | 3/2019 | Hattori | H04N 23/695 |
| 2019/0182422 A1* | 6/2019 | Takahashi | H04N 23/64 |
| 2020/0084390 A1* | 3/2020 | Sato | H04N 23/631 |
| 2022/0006945 A1* | 1/2022 | Bathija | H04N 23/90 |

(Continued)

FOREIGN PATENT DOCUMENTS

JP    2013128251 A    6/2013

*Primary Examiner* — Pritham D Prabhakher
(74) *Attorney, Agent, or Firm* — Canon U.S.A., Inc., IP Division

(57) ABSTRACT

An imaging device includes one or more memories, and one or more processors in communication with the one or more memories. The one or more processors and the one or more memories are configured to capture an image, display a live view image obtained by capturing the image on a display unit, and in a case where a piece of camerawork used to capture a moving image is selected from among a plurality of pieces of camerawork indicating imaging methods for capturing a moving image, then based on attribute information regarding the selected piece of camerawork, perform control to display on the display unit a guide that instructs a user to make a motion according to the selected piece of camerawork.

16 Claims, 19 Drawing Sheets

(56) References Cited

U.S. PATENT DOCUMENTS

| | | | |
|---|---|---|---|
| 2022/0103746 A1* | 3/2022 | Yamaguchi | H04N 23/633 |
| 2023/0164305 A1* | 5/2023 | Ogura | G06T 19/003 |
| | | | 382/154 |

* cited by examiner

FIG.3

| | | CAMERAWORK | | | | | | | | | | | |
|---|---|---|---|---|---|---|---|---|---|---|---|---|---|
| | | FOLLOW | DOLLY IN | DOLLY OUT | CIRCLE | FIX | PAN | TILT | ZOOM IN | ZOOM OUT | RACK FOCUS (IN) | RACK FOCUS (OUT) | TILT FOLLOW | ... |
| OBJECT | PERSON (ENTIRE BODY) | ○ | ○ | | | | | ○ | ○ | ○ | | | ○ | |
| | PERSON (FACE) | | | | ○ | ○ | | | ○ | ○ | ○ | ○ | | |
| | PERSON (PLURALITY OF PEOPLE) | ○ | | | | | | | | | | | | |
| | SCENERY | | | | | | ○ | | ○ | ○ | ○ | ○ | | |
| | ANIMAL | | | | | | | | | | | | | |
| | VEHICLE | | | | | | | | | | | | | |
| | ... | | | | | | | | | | | | | |
| | EXCEPT FOR ABOVE | ○ | ○ | ○ | | | ○ | ○ | | | | | | |

FIG.14A

SCENE [BLUE SKY]

| | | FOLLOW | DOLLY IN | DOLLY OUT | CIRCLE | FIX | PAN | TILT | ZOOM IN | ZOOM OUT | RACK FOCUS (IN) | RACK FOCUS (OUT) | TILT FOLLOW | ... |
|---|---|---|---|---|---|---|---|---|---|---|---|---|---|---|
| | | | | | | | | CAMERAWORK | | | | | | |
| OBJECT | PERSON (ENTIRE BODY) | | | | ○ | | | | | ○ | | | ○ | |
| | PERSON (FACE) | | | | ○ | ○ | | | | ○ | | | | |
| | PERSON (PLURALITY OF PEOPLE) | | | | | | | ○ | | | | | | |
| | SCENERY | | | | | | ○ | | | ○ | | | | |
| | ANIMAL | | | | | | | | | | | | | |
| | VEHICLE | | | | | | | | | | | | | |
| | ... | | | | | | | | | | | | | |
| | EXCEPT FOR ABOVE | ○ | ○ | ○ | | ○ | ○ | ○ | | | | | | |

FIG.14B

SCENE [EVENING VIEW]

| | | CAMERAWORK | | | | | | | | | | | |
|---|---|---|---|---|---|---|---|---|---|---|---|---|---|
| | | FOLLOW | DOLLY IN | DOLLY OUT | DOLLY CIRCLE | FIX | PAN | TILT | ZOOM IN | ZOOM OUT | RACK FOCUS (IN) | RACK FOCUS (OUT) | TILT FOLLOW | ... |
| OBJECT | PERSON (ENTIRE BODY) | ○ | ○ | | ○ | | | ○ | | | | | ○ | |
| | PERSON (FACE) | ○ | | | ○ | ○ | | | | ○ | | ○ | | |
| | PERSON (PLURALITY OF PEOPLE) | | | | | | | | | ○ | | | | |
| | SCENERY | | | | | | ○ | | ○ | | | ○ | | |
| | ANIMAL | | | | | | | | | | | | | |
| | VEHICLE | | | | | | | | | | | | | |
| | ... | | | | | | | | | | | | | |
| | EXCEPT FOR ABOVE | ○ | ○ | ○ | | ○ | ○ | ○ | | | | | | |

FIG.14D

SCENE [OTHERS]

| | | CAMERAWORK | | | | | | | | | | |
|---|---|---|---|---|---|---|---|---|---|---|---|---|
| | | FOLLOW | DOLLY IN | DOLLY OUT | DOLLY CIRCLE | FIX | PAN | TILT | ZOOM IN | ZOOM OUT | RACK FOCUS (IN) | RACK FOCUS (OUT) | TILT FOLLOW | ... |
| OBJECT | PERSON (ENTIRE BODY) | ○ | ○ | | ○ | | | ○ | ○ | ○ | | | |
| | PERSON (FACE) | ○ | | | ○ | ○ | | | ○ | ○ | ○ | ○ | ○ |
| | PERSON (PLURALITY OF PEOPLE) | ○ | | | | | | | | | | | |
| | SCENERY | | | | | | ○ | | ○ | ○ | ○ | ○ | |
| | ANIMAL | | | | | | | | | | | | |
| | VEHICLE | | | | | | | | | | | | |
| | ... | | | | | | | | | | | | |
| | EXCEPT FOR ABOVE | ○ | ○ | ○ | | ○ | ○ | ○ | | | | | |

IMAGING DEVICE, CONTROL METHOD FOR CONTROLLING IMAGING DEVICE, AND STORAGE MEDIUM

BACKGROUND

Field

The present disclosure relates to an imaging device, a control method for controlling an imaging device, and a storage medium.

Description of the Related Art

In recent years, more and more people have captured moving images using cameras, such as digital still cameras or digital video camera. Capturing moving images with appropriate camerawork involves many experiences and techniques to achieve a video expression intended by a user. Japanese Patent Application Laid-Open No. 2013-128251 discusses an imaging device that provides advice regarding setting values of a camera to a user of the camera for the user to capture better still images.

For example, beginners who newly purchase cameras do not understand what video expression techniques are available. Even if there is a video expression intended by a beginner, the beginner does not know how to use the camera to capture an image. Thus, it is difficult for the beginner to perform moving image capturing with appropriate camerawork. In Japanese Patent Application Laid-Open No. 2013-128251, even if advice for still image capturing can be provided, appropriate information regarding camerawork for moving image capturing in which it is necessary to change the relationship between the camera and the user of the camera and an object, as appropriate, cannot be provided to the user of the camera, particularly beginners.

SUMMARY

The present disclosure is directed to providing an imaging device that assists a user of a camera in performing moving image capturing with appropriate camerawork, and a control method for controlling an imaging device.

According to an aspect of the present disclosure, an imaging device includes one or more memories, and one or more processors in communication with the one or more memories. The one or more processors and the one or more memories are configured to capture an image, display a live view image obtained by capturing the image on a display unit, and in a case where a piece of camerawork used to capture a moving image is selected from among a plurality of pieces of camerawork indicating imaging methods for capturing a moving image, then based on attribute information regarding the selected piece of camerawork, perform control to display on the display unit a guide that instructs a user to make a motion according to the selected piece of camerawork.

Further features of the present disclosure will become apparent from the following description of exemplary embodiments with reference to the attached drawings.

BRIEF DESCRIPTION OF THE DRAWINGS

FIG. 3 is a diagram illustrating an example of a configuration of data held in a camerawork information holding unit.

FIGS. 14A to 14D are diagrams illustrating examples of a configuration of data held in a camerawork information holding unit.

DESCRIPTION OF THE EMBODIMENTS

Exemplary embodiments will be described with reference to the attached drawings. The following exemplary embodiments do not limit the disclosure according to the appended claims. In the specification of the present disclosure, an "image" is a concept including not only a "still image" but also a "moving image".

Figure 1:
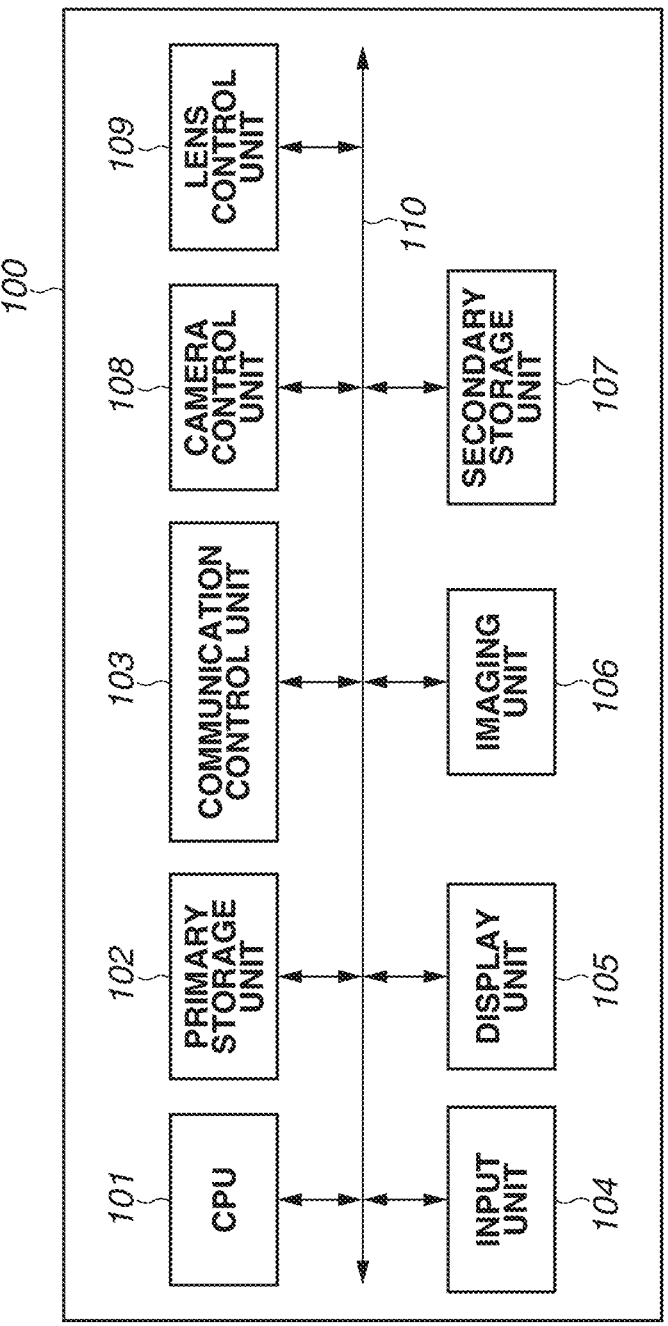
FIG. 1 is a diagram illustrating an example of a hardware configuration of a digital camera.

A first exemplary embodiment will be described. FIG. 1 illustrates the hardware configuration of a digital camera. A digital camera 100 illustrated in FIG. 1 is an example of an imaging device. Hereinafter, the digital camera 100 will occasionally be referred to simply as the "camera". The digital camera 100 includes a central processing unit (CPU) 101, a primary storage unit 102, a communication control unit 103, an input unit 104, a display unit 105, an imaging unit 106, a secondary storage unit 107, a camera control unit 108, and a lens control unit 109. The CPU 101 is connected to these components via a bus 110. In some embodiments, the digital camera 100 is or includes a mobile device, such as a smartphone having a camera function or a tablet.

The CPU 101 controls the entirety of the digital camera 100. The processing of flowcharts described below is achieved by the CPU 101 reading a program stored in the secondary storage unit 107, loading the program into a work area formed in the primary storage unit 102, and operating according to the loaded program. The primary storage unit 102 forms a work area that temporarily stores various programs run by the CPU 101 and data related to these programs.

The communication control unit 103 is connected to an external electronic device (not illustrated), such as a personal computer (PC), using a communication cable, and controls the transmission and reception of data on an image. In other embodiments, the connection to the external electronic device is a wireless connection using infrared light or Wi-Fi, instead of a wired connection using a communication cable. In other embodiment, the communication control unit 103 is also connected to a mobile device, such as a smartphone. In yet other embodiments, the communication control unit 103 is also connected to a network using a communication cable and control the transmission and reception of data to and from a cloud server on a network.

The input unit 104 includes a power key, a shutter key, a movement key for giving an instruction to move the position of a cursor on a display screen of the display unit 105, and a determination key for giving an instruction to set the content selected on the display screen. The input unit 104 also includes a mode change switch (not illustrated) for switching the operation mode of the digital camera 100, such as a normal imaging mode, an imaging assistance mode, an end mode, and a reproduction mode. Then, the input unit 104 outputs operation signals according to operations on the keys and an operation on the switch by a user. Further, the input unit 104 and the display unit 105 each can include a touch panel display having an input function and a display function. In this case, the keys and the switch corresponding to the various operations can be displayed on the touch panel display. The input unit 104 can output an operation signal according to a touch operation on the touch panel display to the CPU 101.

The display unit 105 includes a monitor (a display screen), such as a liquid crystal display (LCD). According to an instruction of a display signal input from the CPU 101, the display unit 105 displays a live view image captured by the imaging unit 106 or an image stored in the secondary storage unit 107 on the display screen.

The imaging unit 106 includes an imaging element that receives object light incident through an optical lens device, converts the object light into an imaging signal, and outputs the imaging signal, and an analog-to-digital (A/D) conversion unit that converts the imaging signal output from the imaging element into image data and outputs the image data. The imaging unit 106 writes the image data output from the A/D conversion unit directly or indirectly to the secondary storage unit 107. The imaging unit 106 is an example of an imaging unit.

The secondary storage unit 107 stores various programs, camerawork information, and images captured by the imaging unit 106. The camerawork information will be described in detail below.

The camera control unit 108 causes a camera main body to operate. Specifically, the camera control unit 108 causes a driving mechanism for moving the camera main body in at least one of a total of six axis directions, namely x, y, and z axis directions in a three-dimensional space and rotational directions about the x, y, and z axes, to operate according to a control signal input from the CPU 101, changing the position and orientation of the camera main body. The camera control unit 108 includes a driving device, such as a motor and a driving circuit. The camera control unit 108 also includes an acceleration sensor and an angular velocity sensor for detecting the position and orientation of the camera main body.

The lens control unit 109 causes a lens to operate. Specifically, the lens control unit 109 causes the optical lens device of the imaging unit 106 to operate according to a control signal input from the CPU 101, changing the zoom, the focus, or the aperture of the lens. The lens control unit 109 includes a driving device, such as a motor and a driving circuit.

The functional configuration of the digital camera 100 according to the present exemplary embodiment will now be described with reference to FIG. 2.

Figure 2:
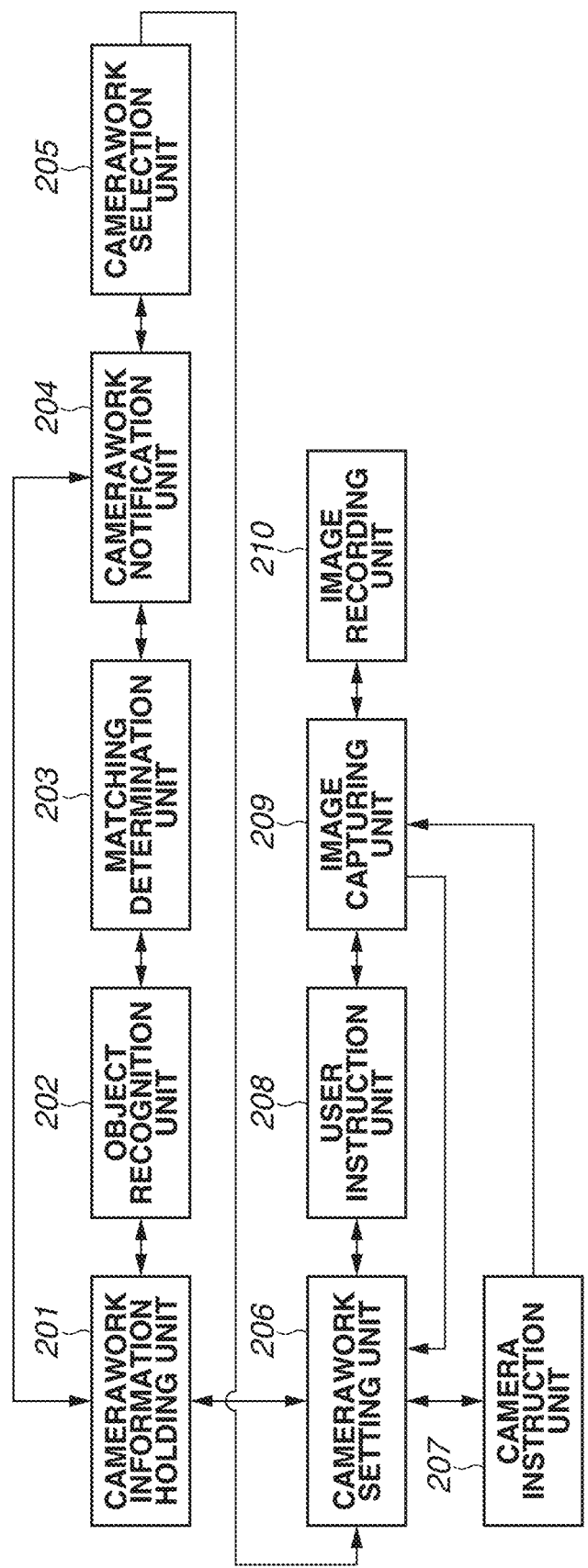
FIG. 2 is a diagram illustrating an example of a functional configuration of the digital camera.

The digital camera 100 functions as functional units illustrated in FIG. 2 by the CPU 101 running programs stored in the secondary storage unit 107. A description is given of the functions of a camerawork information holding unit 201, an object recognition unit 202, a matching determination unit 203, a camerawork notification unit 204, and a camerawork selection unit 205 included in the digital camera 100.

The camerawork information holding unit 201 holds one or more pieces of camerawork information in association with pieces of information regarding a plurality of objects. An example is illustrated where the type of each object is associated with pieces of camerawork information suitable for the type of the object. Examples of the type of the object include the entire body of a person, the face of a person, a scenery, and an animal. In some embodiments, the size and the position of each object and movement information regarding the object (whether the object is a static object or a dynamic object and the moving velocity and the moving direction of the object) are associated with pieces of camerawork information suitable for the size, the position, and the movement information.

FIG. 3 illustrates the configuration of data held in the camerawork information holding unit 201 according to the present exemplary embodiment. As illustrated in FIG. 3, the camerawork information holding unit 201 holds a data table illustrating the association of pieces of camerawork with the type of each object. Examples of the pieces of camerawork include follow, dolly in, dolly out, circle, fix, pan, tilt, zoom in, zoom out, rack focus (in), rack focus (out), and tilt follow.

Follow, dolly in, dolly out, and circle is each an imaging method in which the user performs moving image capturing while moving the camera main body by holding the camera main body. Follow is an imaging method in which the user performs moving image capturing while following the motion of the object. Dolly in and dolly out are each an imaging method in which the user performs moving image capturing while moving close to or away from the object. Circle is an imaging method in which the user performs moving image capturing while moving by drawing a circle about the object. Fix is an imaging method for performing moving image capturing with the camera main body fixed. Pan is an imaging method for performing moving image capturing while moving the camera main body in the horizontal directions. Tilt is an imaging method for performing moving image capturing while moving the camera main body in the vertical directions. Zoom in and zoom out are each an imaging method for performing moving image capturing while causing a zoom function of the imaging unit 106 to operate. Rack focus (in) and rack focus (out) are each an imaging method for performing moving image capturing while causing a focus function of the imaging unit 106 to operate. Tilt follow is an imaging method for performing moving image capturing while simultaneously moving the user and moving the camera main body. The types of the pieces of camerawork are not limited to the above.

Figure 4:
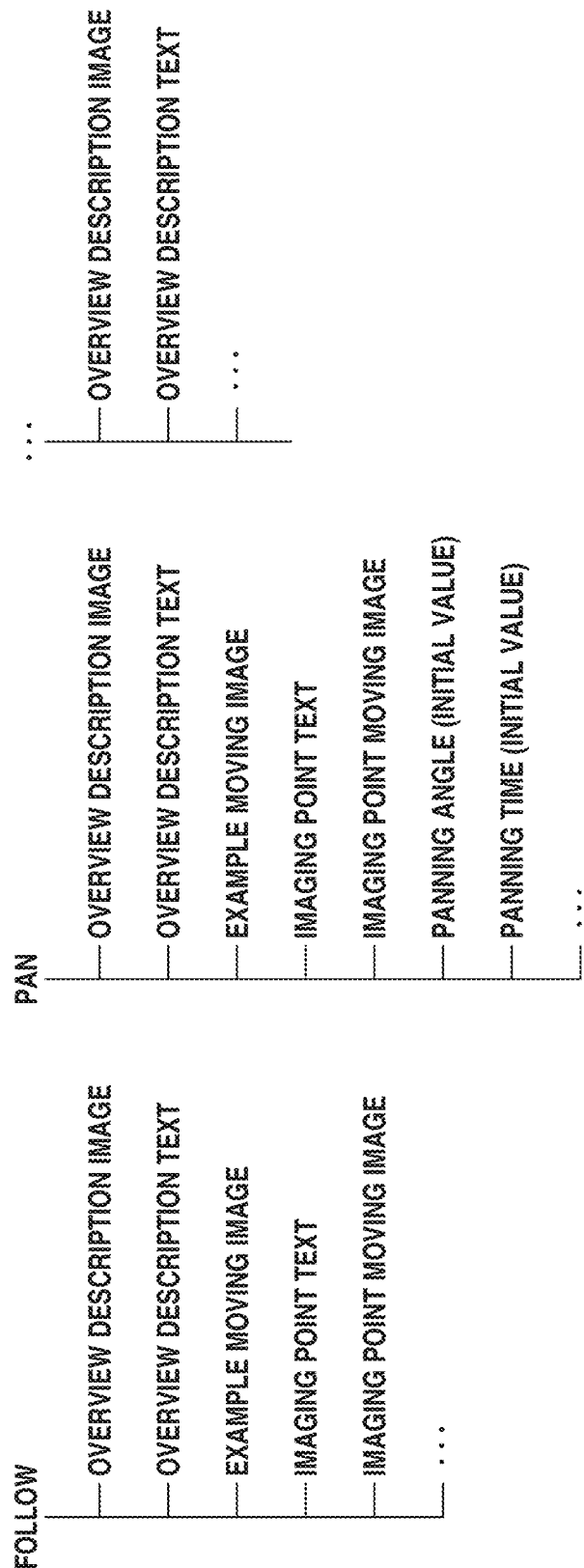
FIG. 4 is a diagram illustrating an example of a configuration of camerawork information.

FIG. 4 illustrates an example of the configuration of camerawork information regarding each of the pieces of camerawork. The camerawork information is created in advance according to a template. The camerawork information includes attribute information to perform moving image capturing with the piece of camerawork, such as information regarding how the user moves the camera main body, the path of the camera main body, and the motion of the camera itself. Specifically, the camerawork information includes the information in formats, such as characters, a schematic diagram or an image representing a composition during moving image capturing, and numerical values (the moving velocity, the moving direction, the moving time, and the moving angle of the camera main body and the setting values of the camera). In some embodiment, the user can appropriately change the various numerical values included in the camerawork information by a touch operation or a key operation through the input unit 104. In these cases, the camerawork information can further include an example of a moving image captured with the piece of camerawork (an example moving image) and a moving image obtained by recording a method for capturing an image with the piece of camerawork from a third person's point of view (an imaging point moving image). FIG. 4 illustrates an example of the camerawork information regarding follow and the camerawork information regarding pan.

The information held in the camerawork information holding unit 201 is stored in the secondary storage unit 107. In other embodiments, a part of the information can be stored in an external storage device connected to the digital camera 100 via the communication control unit 103. For example, the example moving image or the moving image regarding the method for capturing an image can be stored in the external storage device or the cloud server.

First, the object recognition unit 202 acquires a group of images captured by the imaging unit 106 until a predetermined time before the current moment as currently captured moving image data from the secondary storage unit 107. Then, the object recognition unit 202 analyzes the acquired moving image data and recognizes an object appearing in the moving image data. Specifically, the object recognition unit 202 acquires the type, the size, and the position of the object and the movement information regarding the object using information including the color distribution and the exposure distribution in an image obtained from the moving image data and information regarding changes over time in the color distribution and the exposure distribution. The movement information is information regarding whether the object is a static object or a dynamic object, and information regarding the moving velocity and the moving direction of the object if the object is a dynamic object. Examples of the type of the object recognized by the object recognition unit 202 include a person, the entire body of a person, the face of a person, the front surface of a person, the back surface of a person, a pupil, an animal, a scenery (without a person), and a building. If the object recognition unit 202 recognizes a plurality of objects from the moving image data, the object recognition unit 202 can acquire information regarding each of the plurality of objects. Further, the object recognition unit 202 can identify a main object from the plurality of objects and acquire information regarding the main object alone.

The matching determination unit 203 compares the information regarding the object acquired by the object recognition unit 202 and the pieces of information regarding the objects associated with the pieces of camerawork information held in the camerawork information holding unit 201 and determines whether there are pieces of camerawork information in which the information regarding the object acquired by the object recognition unit 202 and the pieces of information regarding the objects associated with the pieces of camerawork information match each other. If there are pieces of camerawork information in which the information regarding the object acquired by the object recognition unit 202 and the pieces of information regarding the objects associated with the pieces of camerawork information match each other, the matching determination unit 203 determines at least one of the pieces of camerawork information associated with the information regarding the same object to be the information regarding the object acquired by the object recognition unit 202 as recommended camerawork. If there are no pieces of camerawork information in which the information regarding the object acquired by the object recognition unit 202 and the pieces of information regarding the objects associated with the pieces of camerawork information match each other, the matching determination unit 203 determines at least one piece of camerawork information determined in advance as recommended camerawork. In the example of FIG. 3, since the pieces of camerawork information are associated with the type of each object, recommended camerawork is determined using the type of the object. However, recommended camerawork can be determined using the size and the position of the object and the movement information regarding the object.

The camerawork notification unit 204 displays a notification based on the recommended camerawork determined by the matching determination unit 203 on the display unit 105. Instead of displaying the notification on the display unit 105 of the digital camera 100, the camerawork notification unit 204 can communicate with an external electronic device via the communication control unit 103 and display the notification on, for example, a display screen of a PC or a mobile terminal. Furthermore, the camerawork notification unit 204 can give the notification by another method, such as using a sound output unit (not illustrated), instead of the method for displaying the notification.

With reference to FIG. 3, a specific description is given of the operation of the camerawork notification unit 204 when the object recognition unit 202 recognizes the entire body of a person. In this case, the matching determination unit 203 determines follow, dolly in, circle, tilt, zoom in, zoom out, and tilt follow associated with a person (the entire body) among the plurality of pieces of camerawork held in the camerawork information holding unit 201 as pieces of recommended camerawork. Then, the camerawork notification unit 204 gives a notification based on the determined pieces of recommended camerawork. If there is a plurality of pieces of camerawork information associated with the same type of object as the type of the object acquired by the object recognition unit 202, the camerawork notification unit 204 can give a notification by narrowing down the plurality of pieces of camerawork information to some of the plurality of pieces of camerawork information. In this case, the camerawork notification unit 204 can give a notification based on pieces of camerawork information set in advance by the user. Alternatively, the camerawork notification unit 204 can give a notification based on a predetermined number of pieces of camerawork information having high priorities.

Figure 5:
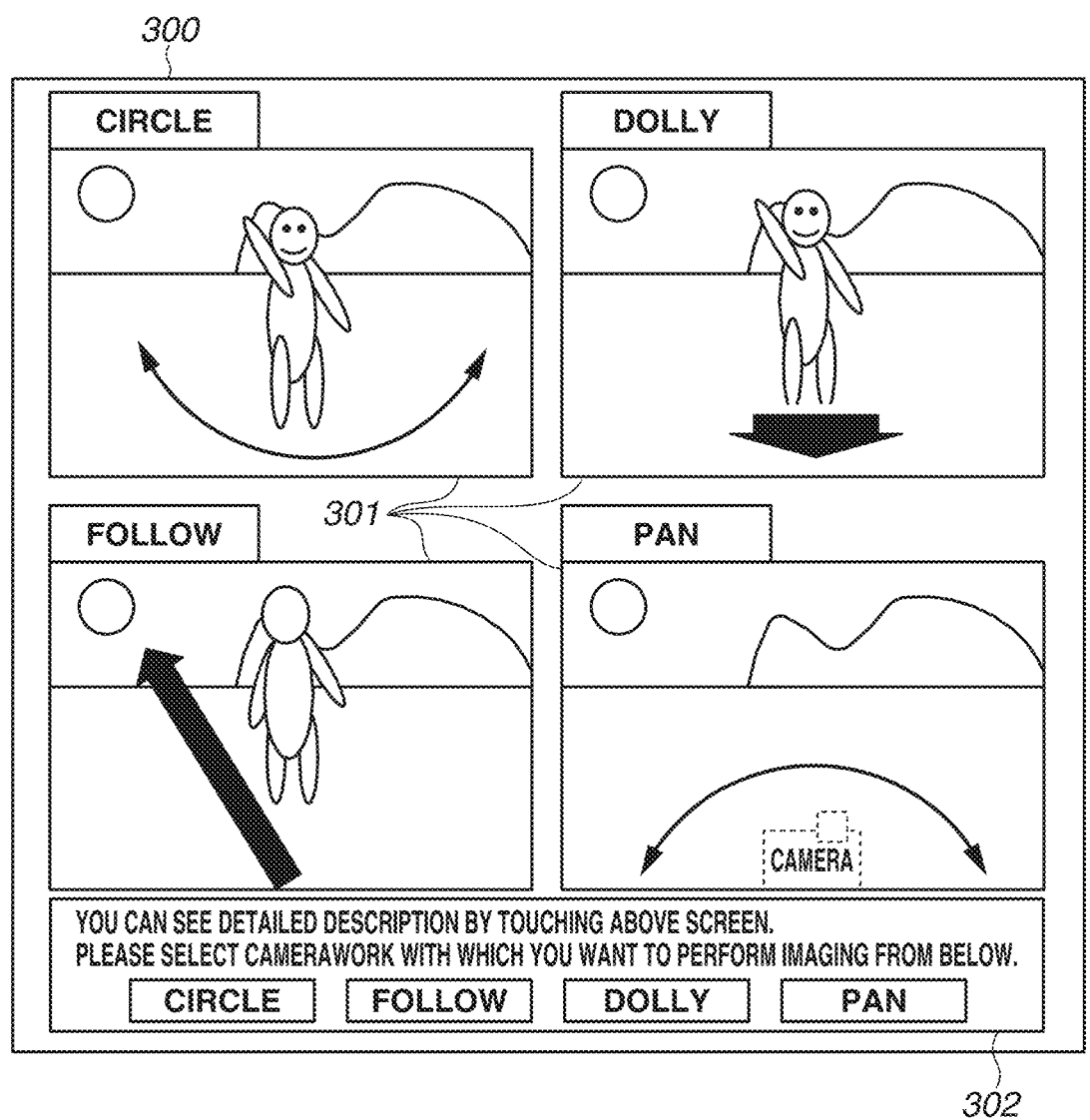
FIG. 5 is a diagram illustrating an example of a recommended camerawork notification screen.

FIG. 5 illustrates an example of a recommended camerawork notification screen. A recommended camerawork notification screen 300 is displayed on the display unit 105. The recommended camerawork notification screen 300 in FIG. 5 displays a recommended camerawork notification 301 regarding four pieces of recommended camerawork, namely circle, dolly in, follow, and pan. The camerawork notification unit 204 acquires the pieces of camerawork information regarding the pieces of recommended camerawork from the camerawork information holding unit 201 and displays the recommended camerawork notification 301 using the acquired pieces of camerawork information. In the example of FIG. 5, the camerawork notification unit 204 displays the recommended camerawork notification 301 by superimposing an arrow and description text on a thumbnail image of a schematic diagram or an example moving image included in each of the pieces of camerawork information regarding circle, dolly in, follow, and pan. Each arrow illustrated in FIG. 5 schematically represents the user of the camera or the motion of the camera itself during moving image capturing.

The recommended camerawork notification screen 300 also displays a camerawork selection area 302. In the camerawork selection area 302, a user interface (UI) is provided for selecting a single piece of recommended camerawork from among the pieces of recommended camerawork of which the notification is given. If a piece of recommended camerawork is selected in the camerawork selection area 302 by an operation of the user through the input unit 104, the camerawork notification unit 204 displays a detailed description of the selected piece of recommended camerawork on the display unit 105.

Figure 6:
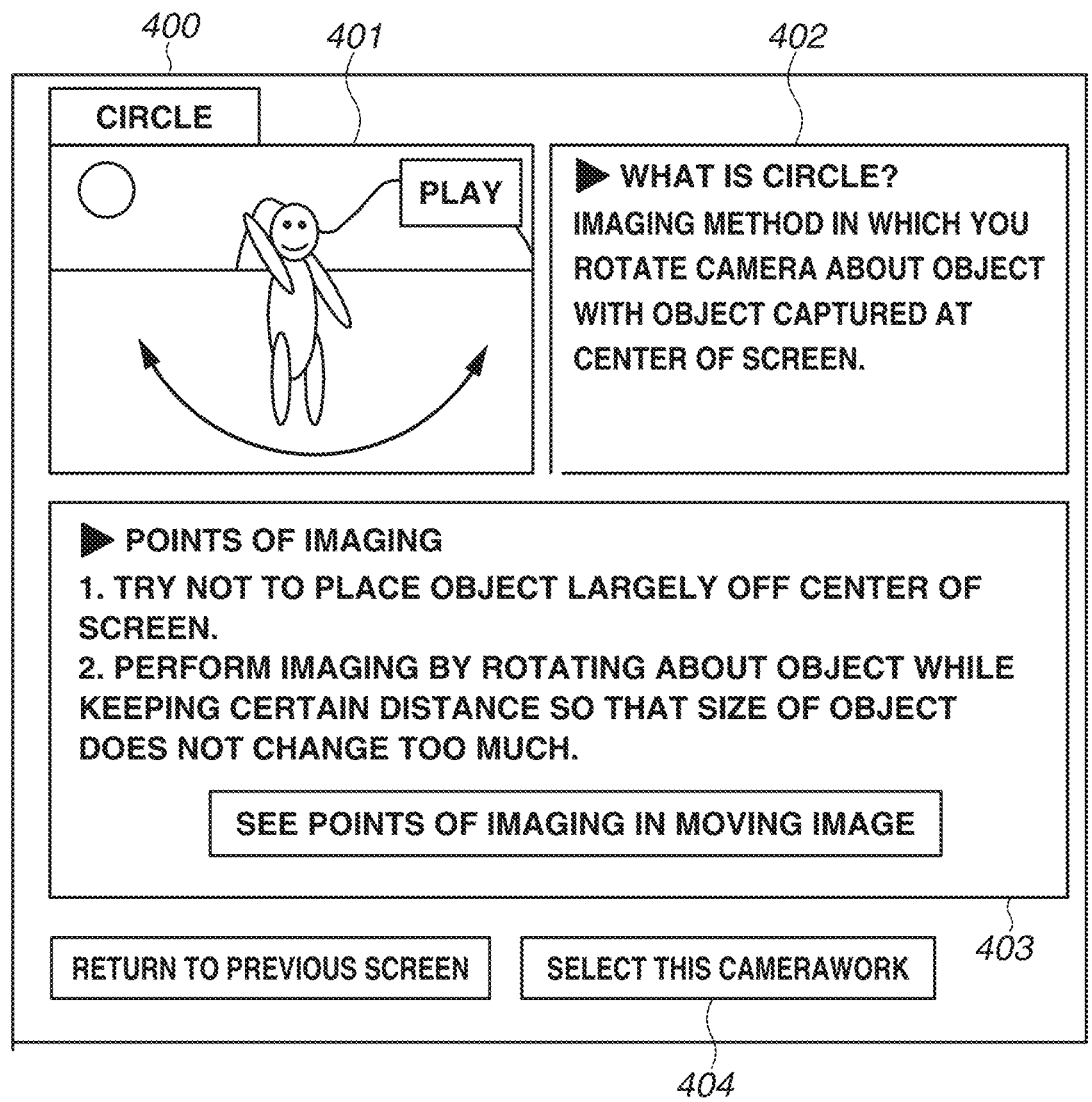
FIG. 6 is a diagram illustrating an example of a recommended camerawork details screen.

FIG. 6 illustrates an example of a recommended camerawork details screen for the currently selected piece of recommended camerawork. A recommended camerawork details screen 400 is a screen displaying the detailed description of the piece of recommended camerawork currently selected in FIG. 5 and is displayed on the display unit 105. The recommended camerawork details screen 400 displays an example moving image 401, an overview description 402, and points of imaging 403 as description information. Information displayed as the description information is included in the pieces of camerawork information and is held in the camerawork information holding unit 201 as described above. The recommended camerawork details screen 400 also displays a camerawork selection key 404. If the camerawork selection key 404 is selected by an operation of the user through the input unit 104, the camerawork selection unit 205 selects the currently selected piece of recommended camerawork as camerawork for use in moving image capturing.

A description will now be given of the functions of a camerawork setting unit 206, a camera instruction unit 207, a user instruction unit 208, an image capturing unit 209, and an image recording unit 210 included in the digital camera 100.

The camerawork setting unit 206 acquires the camerawork information regarding the camerawork selected by the camerawork selection unit 205 from the camerawork information holding unit 201 and provides the camerawork information to the camera instruction unit 207 or the user instruction unit 208. Further, the camerawork setting unit 206 instructs the camera instruction unit 207 or the user instruction unit 208 to start controlling the operation of the camerawork selected by the camerawork selection unit 205.

For example, if the selected camerawork is pan, the camerawork setting unit 206 notifies the camera instruction unit 207 of the angle and the time of panning. Information regarding the angle and the time of panning is included in the camerawork information regarding pan held in the camerawork information holding unit 201. In some embodiments, the user can appropriately change the angle and the time of panning by a touch operation or a key operation through the input unit 104.

If the selected camerawork is follow, the camerawork setting unit 206 notifies the user instruction unit 208 of the information regarding the object acquired by the object recognition unit 202 and the camerawork information regarding follow held in the camerawork information holding unit 201. The information regarding the object of which the user instruction unit 208 is notified includes the size and the position of the object and the movement information regarding the object.

If the camera instruction unit 207 is instructed to start controlling the operation of the camerawork, the camera instruction unit 207 instructs the camera control unit 108 or the lens control unit 109 to start operating. In the example of pan, the camera instruction unit 207 outputs a control signal based on the angle and the time of panning of which the camera instruction unit 207 is notified by the camerawork setting unit 206 to the camera control unit 108. The camera control unit 108 performs a panning operation on the camera according to the control signal from the camera instruction unit 207. The start of the operation of the camera main body or the lens and the start of the control of the operation of the camerawork can be performed at different timings.

If the user instruction unit 208 is instructed to start controlling the operation of the camerawork, the user instruction unit 208 performs control to display on the display unit 105 a guide that instructs the user to move or perform a camera operation.

Figure 7:
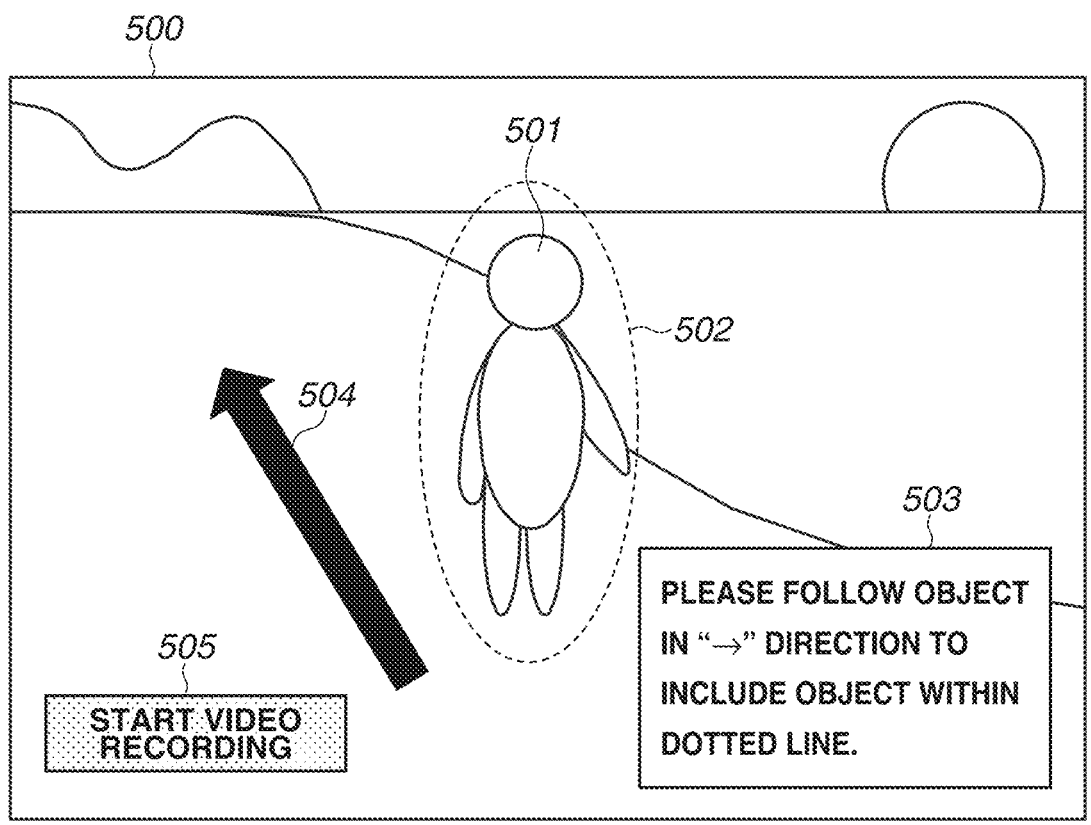
FIG. 7 is a diagram illustrating an example of a display screen during moving image capturing.

FIG. 7 illustrates an example of a display screen that displays a guide with follow as the selected camerawork. The image capturing unit 209 displays an image captured by the imaging unit 106 in real time on the display unit 105, whereby the display unit 105 displays a live view image. A live view image 500 in FIG. 7 represents a scene where a person is walking away from the user of the camera along the shore in the evening. Based on the information provided by the camerawork setting unit 206, the user instruction unit 208 displays a guide that instructs the user to move according to the selected camerawork in a superimposed manner on the live view image 500.

Specifically, the user instruction unit 208 displays on the live view image 500 a guide frame 502 that guides the position of a main object 501 (the entire body of the person) in the live view image 500.

The guide frame 502 indicates to the user where in the screen and in what size the main object 501 should be maintained during moving image capturing with follow. The position and the size of the guide frame 502 can be set in advance. In other embodiments, the user instruction unit 208 can automatically set the position and the size of the guide frame 502 according to the size and the position of the object in the live view image 500 before or when the control of the operation of the selected camerawork starts.

A message 503 and an arrow 504 indicate details, such as how to move while holding the camera during the moving image capturing and a note of caution in the movement, to the user. The size and the direction of the arrow 504 can be set in advance. In other embodiments, the user instruction unit 208 can automatically set the size and the direction of the arrow 504 according to the moving velocity and the moving direction of the object in the live view image 500 before or when the control of the operation of the camerawork starts. The guide frame 502, the message 503, and the arrow 504 are examples of the guide. The user captures the object while moving according to the guide, and then can perform appropriate moving image capturing with the selected camerawork. The user instruction unit 208 also has the function of updating the guide based on the information regarding the object acquired by the object recognition unit 202 during the control of the operation of the camerawork. The display unit 105 also displays a start video recording key 505 with the live view image 500.

If the start video recording key 505 is selected by an operation of the user through the input unit 104, the image recording unit 210 receives an instruction to start video recording.

The image capturing unit 209 captures the object using the imaging unit 106.

If the image recording unit 210 receives an instruction to start video recording, the image recording unit 210 records moving image data captured by the image capturing unit 209 from the reception of the instruction to start video recording to the end of video recording as a moving image file in the secondary storage unit 107.

Figure 8:
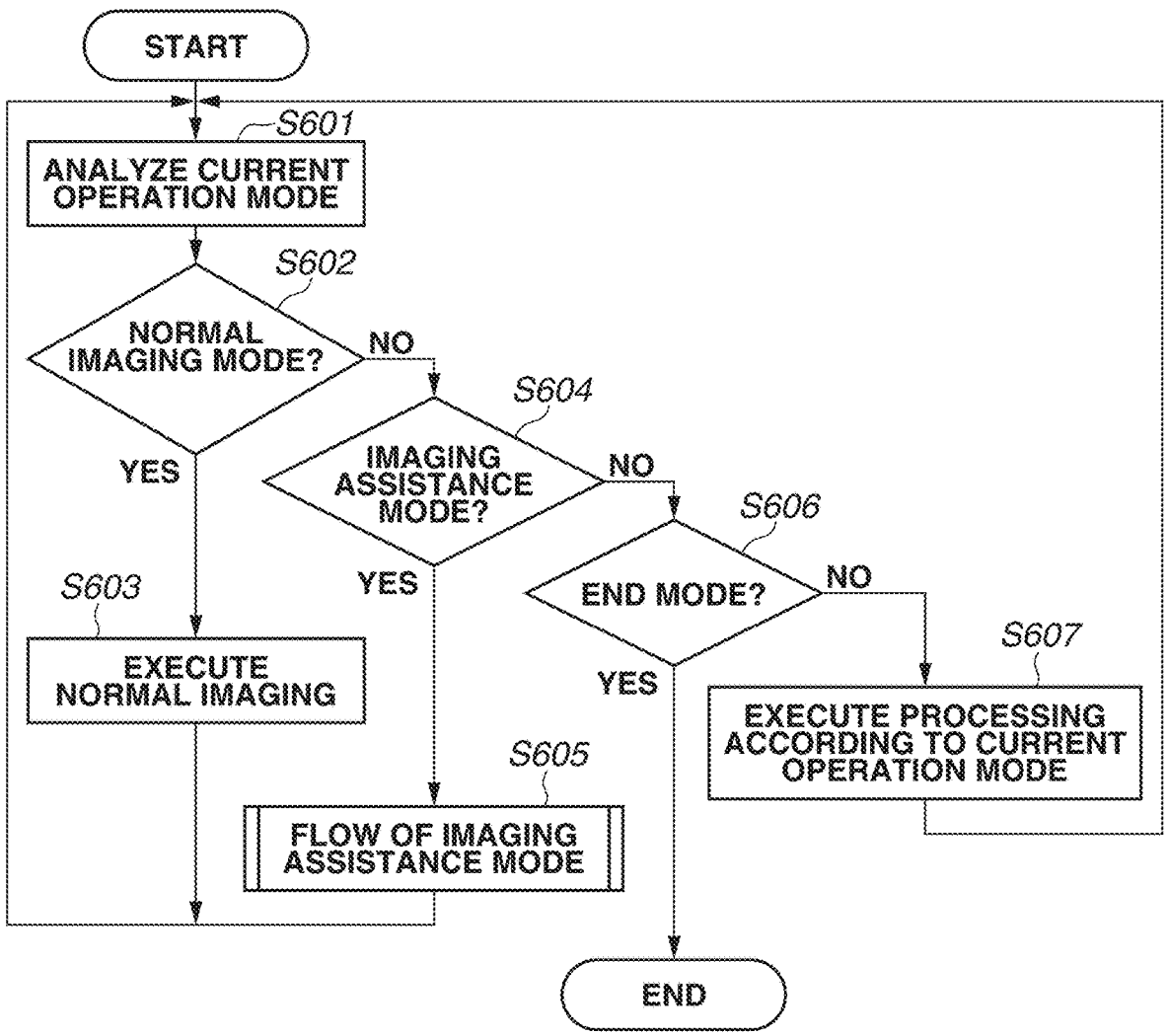
FIG. 8 is a flowchart illustrating main processing of moving image capturing.

FIG. 8 is a flowchart illustrating main processing of moving image capturing. The processing of this flowchart is achieved by the CPU 101 loading a program stored in the secondary storage unit 107 into the primary storage unit 102 and running the program.

First, in step S601, the CPU 101 analyzes the current operation mode. The current operation mode can be switched by operating the mode change switch (not illustrated) of the input unit 104.

In step S602, the CPU 101 determines whether the current operation mode is the normal imaging mode. If it is determined that the current operation mode is the normal imaging mode (Yes in step S602), the processing proceeds to step S603. The normal imaging mode is an imaging mode for performing imaging by processing set in advance as standard in the digital camera 100. If, on the other hand, it is determined that the current operation mode is not the normal imaging mode (No in step S602), the processing proceeds to step S604.

In step S603, the CPU 101 executes processing in the normal imaging mode. Then, the processing returns to step S601.

In step S604, the CPU 101 determines whether the current operation mode is the imaging assistance mode. If it is determined that the current operation mode is the imaging assistance mode (Yes in step S604), the processing proceeds to step S605. If, on the other hand, it is determined that the current operation mode is not the imaging assistance mode (No in step S604), the processing proceeds to step S606.

In step S605, the CPU 101 executes the processing flow of the imaging assistance mode. The processing flow of the imaging assistance mode will be described in detail with reference to FIG. 9. Then, the processing returns to step S601.

In step S606, the CPU 101 determines whether the current operation mode is the end mode. If it is determined that the current operation mode is not the end mode (No in step S606), the processing proceeds to step S607. If, on the other hand, it is determined that the current operation mode is the end mode (Yes in step S606), the processing of the flowchart in FIG. 8 ends.

In step S607, the CPU 101 executes processing according to the current operation mode. Then, the processing returns to step S601.

For example, if the current operation mode is the reproduction mode, the CPU 101 displays a list of images recorded in the secondary storage unit 107 on the display screen of the display unit 105 and displays an image selected from the list of images.

Figure 9:
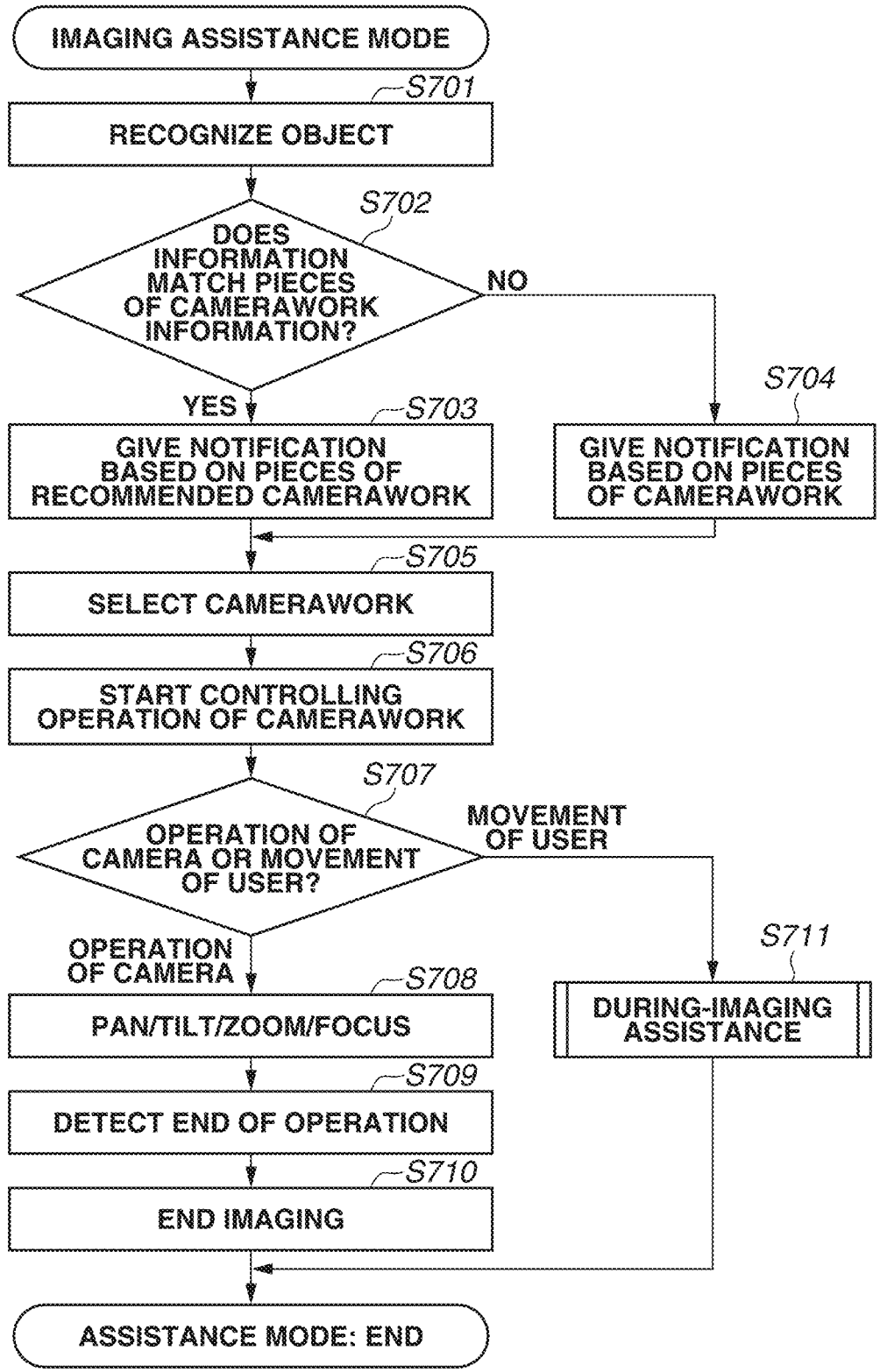
FIG. 9 is a flowchart illustrating processing performed in an imaging assistance mode.

FIG. 9 illustrates the processing flow of the imaging assistance mode according to the present exemplary embodiment. The processing in the imaging assistance mode is the process executed in step S605 in FIG. 8. During the execution of the processing in the imaging assistance mode, the image capturing unit 209 performs imaging, and a group of images captured by the image capturing unit 209 until a predetermined time before the current moment is stored in the secondary storage unit 107 as currently captured moving image data. The currently captured moving image data is sequentially updated. The display unit 105 displays a live view image.

In step S701, the object recognition unit 202 analyzes the currently captured moving image data and acquires the type of an object appearing in the moving image data and information regarding whether the object is a dynamic object or a static object.

In step S702, the matching determination unit 203 compares the information regarding the object acquired in step S701 and the pieces of information regarding the objects associated with the pieces of camerawork information held in the camerawork information holding unit 201 and determines whether there are pieces of camerawork information that match the information acquired in step S701. If it is determined that there are pieces of camerawork information that match the information acquired in step S701 (Yes in step S702), the matching determination unit 203 determines the pieces of camerawork information that match the information acquired in step S701 as pieces of recommended camerawork. Then, the processing proceeds to step S703. If, on the other hand, it is determined that there are no pieces of camerawork information that match the information acquired in step S701 (No in step S702), the processing proceeds to step S704.

In step S703, the camerawork notification unit 204 gives a notification based on the determined pieces of recommended camerawork. For example, the camerawork notification unit 204 displays the recommended camerawork notification screen 300 (FIG. 5) on the display unit 105.

In step S704, the camerawork notification unit 204 gives a notification based on the pieces of camerawork information regarding pieces of camerawork determined in advance (pieces of camerawork corresponding to "except for above" in FIG. 3).

In step S705, if the user operates the input unit 104, specifying the user's favorite camerawork from among the pieces of camerawork based on which the notification is given, the camerawork selection unit 205 selects the specified camerawork. The camerawork selection unit 205 acquires the camerawork information regarding the selected camerawork from the camerawork information holding unit 201 and notifies the camerawork setting unit 206 of the camerawork information.

In step S706, the camerawork setting unit 206 starts controlling the operation of the camerawork based on the camerawork information regarding the camerawork selected in step S705. Thus, moving image capturing according to the selected camerawork starts. In step S707, the camerawork setting unit 206 determines whether the camerawork selected in step S705 is camerawork that involves the movement of the user or camerawork that can be handled by controlling the operation of the camera. In the present exemplary embodiment, if the camerawork selected in step S705 is camerawork that can be handled under control of the camera control unit 108 and the lens control unit 109, it is determined that the camerawork selected in step S705 is camerawork that can be handled by controlling the operation of the camera. For example, the camerawork that can be handled by controlling the operation of the camera is pan, tilt, zoom in, zoom out, or rack focus. Further, the operation of the camerawork during the moving image capturing can be performed by a manual operation of the user. That is, the camerawork as a target of during-imaging assistance is not limited to camerawork that involves the movement of the user. In the during-imaging assistance regarding such camerawork, a guide that gives an instruction to perform a camera operation (e.g., a zoom operation) of the user is displayed on the live view image.

If it is determined that the camerawork selected in step S705 is camerawork that can be handled by controlling the operation of the camera ("operation of camera" in step S707), the processing proceeds to step S708. If, on the other hand, it is determined that the camerawork selected in step S705 is camerawork that involves the movement of the user ("movement of user" in step S707), the processing proceeds to step S711.

In step S708, the camera instruction unit 207 controls the camera control unit 108 or the lens control unit 109 according to the camerawork information regarding the camerawork selected in step S705, controlling the operation of the camera main body or the lens, such as pan, tilt, zoom, or focus. Simultaneously with the start of the control of the operation of the camerawork or when an instruction to start video recording is received from the user, the image recording unit 210 starts recording the moving image data captured by the image capturing unit 209 as a moving image file.

In step S709, the camera instruction unit 207 detects the end of the operation of the camera main body or the lens from the camera control unit 108 of the lens control unit 109.

In step S710, the image recording unit 210 ends the recording of the moving image data. Then, the image capturing unit 209 ends the imaging. Then, the processing in the imaging assistance mode ends.

In step S711, the CPU 101 executes the processing of the during-imaging assistance. Then, if the processing of the during-imaging assistance ends, the processing in the imaging assistance mode ends.

Figure 10:
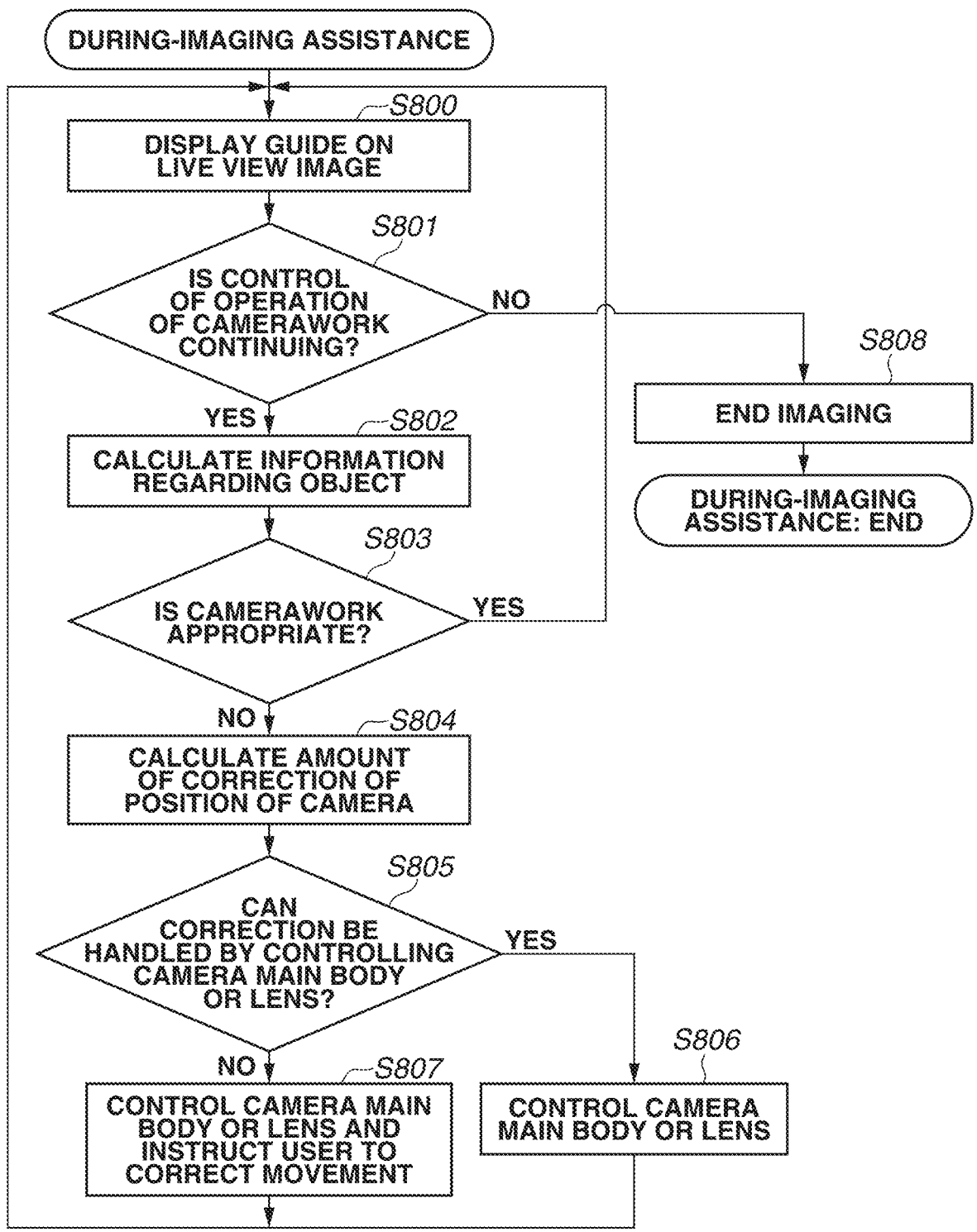
FIG. 10 is a flowchart illustrating details of processing of during-imaging assistance.

FIG. 10 illustrates the processing flow of the during-imaging assistance according to the present exemplary embodiment. The processing of the during-imaging assistance is the process executed in step S711 in FIG. 9. Simultaneously with the start of the processing of the during-imaging assistance or when an instruction to start video recording is received from the user (when the start video recording key 505 is pressed), the image recording unit 210 starts recording the moving image data captured by the image capturing unit 209 as a moving image file.

In step S800, based on the camerawork information regarding the camerawork selected in step S705, the user instruction unit 208 displays a guide that instructs the user to move in a superimposed manner on the live view image. For example, the user instruction unit 208 displays the display screen in FIG. 7 on the display unit 105.

In step S801, the image capturing unit 209 determines whether the control of the operation of the camerawork is continuing. If it is determined that the control of the operation of the camerawork is continuing (Yes in step S801), the processing proceeds to step S802. If it is determined that the control of the operation of the camerawork is completed (No in step S801), the processing proceeds to step S808. For example, if the object comes out of the frame of the currently captured moving image data, the camerawork setting unit 206 instructs the user instruction unit 208 to end the control of the operation of the camerawork.

In step S802, the object recognition unit 202 analyzes the currently captured moving image data and calculates the size and the position of the object appearing in the moving image data and the movement information regarding the object (the moving velocity and the moving direction of the object).

In step S803, based on the information regarding the object calculated in step S802, the user instruction unit 208 determines whether the operation of the camerawork selected in step S705 is appropriately performed. If it is determined that the operation of the camerawork is not appropriately performed (No in step S803), the processing proceeds to step S804. If it is determined that the operation of the camerawork is appropriately performed (Yes in step S803), the processing returns to step S800. In step S800, the user instruction unit 208 can update the display of the guide based on the camerawork information regarding the camerawork selected in step S705 and the size and the position of the object and the movement information regarding the object calculated in step S802. Specifically, the user instruction unit 208 can change the size or the position of a guide frame or change the direction of an arrow. This allows instruction given to the user to move so that an appropriate operation of the camerawork according to the position and the motion of the object at the current moment is performed during the moving image capturing.

For example, suppose that the display screen illustrated in FIG. 7 is displayed during the processing of the during-imaging assistance. The instruction of the guide illustrated in FIG. 7 involves the user performing imaging while moving so that the main object 501 in the live view image 500 is included in an appropriate size within the guide frame 502. That is, the movement of the user according to the instruction of the guide during the moving image capturing is an appropriate operation of the camerawork.

Figure 11:
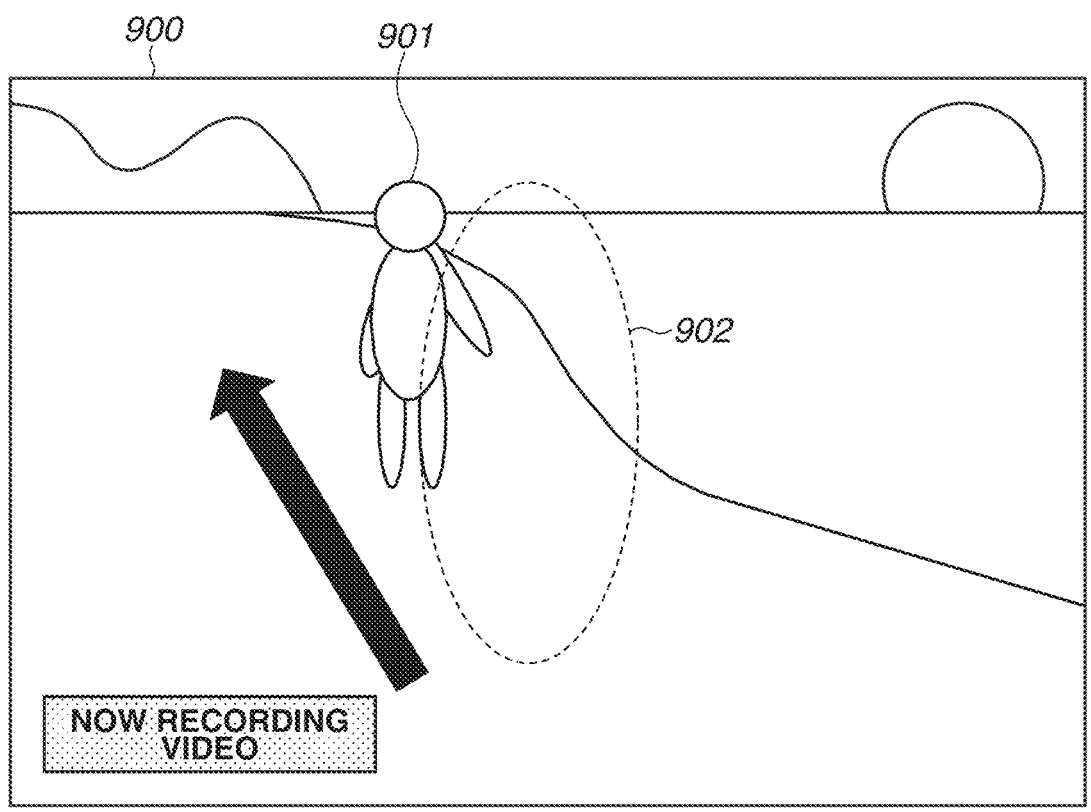
FIG. 11 is a diagram illustrating an example of a display screen during the moving image capturing.

FIG. 11 is an example of a display screen displayed after a while since the start of display of the display screen in FIG. 7. A main object 901 in a live view image 900 in FIG. 11 is shifted from a guide frame 902 in the left direction of the screen and becomes too small relative to the size of the guide frame 902. As described above, in some cases, the object protrudes from the guide frame in the left-right direction of the screen, or the object becomes too small (or large). This indicates that the movement of the user according to the instruction of the guide is not performed.

In step S804, based on the information regarding the object calculated in step S802 and the camerawork information regarding the camerawork selected in step S705, the camera instruction unit 207 calculates the amount of correction of the camera to achieve an appropriate operation of the camerawork. Specifically, taking into account the focal length of the lens, the angle of view, and the amount of shift of the object from a desired position, the camera instruction unit 207 calculates the amount of correction of the position and orientation or the enlargement ratio of the camera.

In the example of FIG. 11, from the angle of view (angle) of the lens and the proportion of the amount of shift to the screen, the camera instruction unit 207 calculates the amount of correction indicating to what extent (at what degrees) the camera should be panned in the left-right directions to correct the shift of the object in the left-right directions. Regarding the state where the object becomes too small, the camera instruction unit 207 can correct the size of the object by zooming in. The camera instruction unit 207 calculates the amount of correction of the size of the object from the size of the object at both the current time and the time when the during-imaging assistance starts, and the amount of change in the angle of view (the enlargement ratio) by zooming.

In step S805, the camera instruction unit 207 compares the amount of correction calculated in step S804 and a threshold set in advance and determines whether the correction can be handled by controlling the operation of the camera main body or the lens. If it is determined that the amount of correction is smaller than the threshold and the correction can be handled by controlling the operation of the camera main body or the lens (Yes in step S805), the processing proceeds to step S806. If, on the other hand, it is determined that the amount of correction is greater than or equal to the threshold and the correction cannot be handled by controlling the operation of the camera main body or the lens (No in step S805), the processing proceeds to step S807.

In the above example where the object becomes too small, the size of the object can be corrected by zooming in. If, however, zooming is performed, the appearance range of the background as well as the size of the object changes. If this change is too great, the moving image is not a smooth moving image on the whole. Thus, there is an acceptable range for the correction of the size of the object by zooming. Moreover, the enlargement ratio has a limit value. Thus, a threshold can be provided in advance for the amount of correction that can be handled by controlling the operation of the camera main body or the lens. The threshold can be fixed or be appropriately changed by the user. If the threshold is 0 (if the threshold is not provided), the camera instruction unit 207 does not control the operation of the camera main body or the lens.

In step S806, based on the amount of correction calculated in step S804, the camera instruction unit 207 controls the operation of the camera main body by driving the camera main body to the left and right or zooming in or out using the camera control unit 108 or the lens control unit 109. Then, the processing returns to step S800.

In step S807, based on the amount of correction calculated in step S804, the camera instruction unit 207 controls the operation of the camera main body by driving the camera main body to the left and right or zooming in or out using the camera control unit 108 or the lens control unit 109. Simultaneously with this control, the user instruction unit 208 displays correction information that gives an instruction to correct the movement of the user on the live view image. While both the camera main body and the lens are controlled in steps S806 and S807, a configuration can be employed in which either the camera main body or the lens is controlled.

Figure 12:
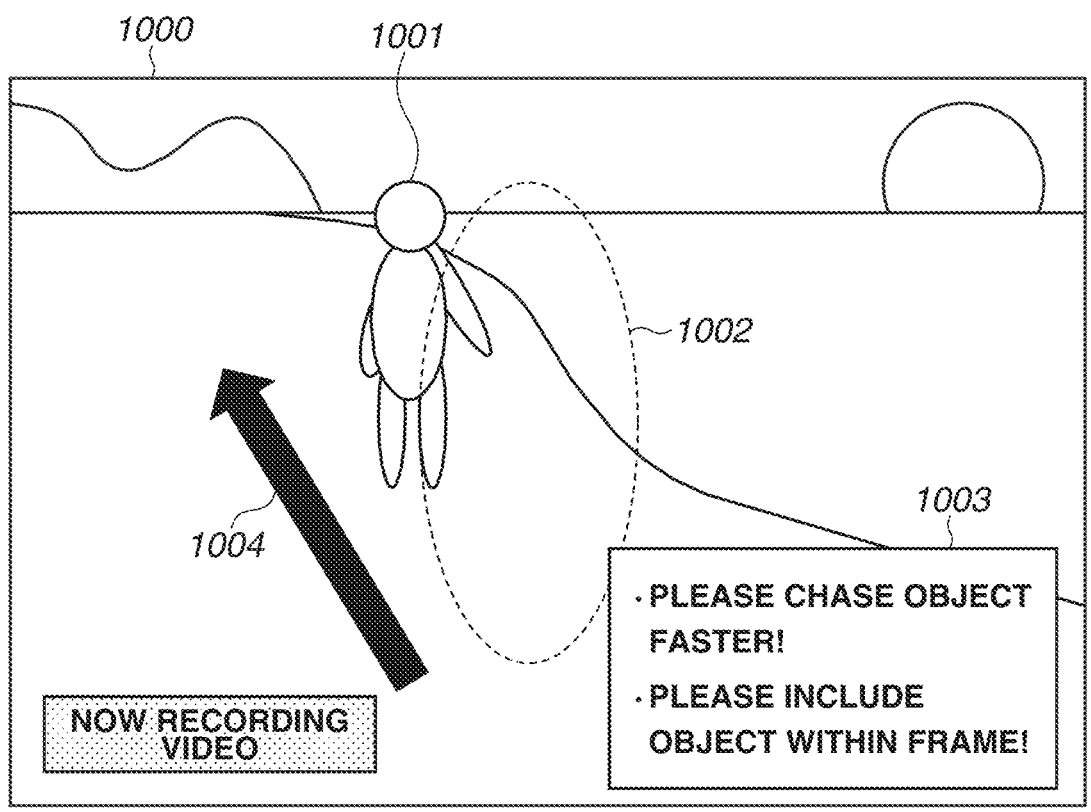
FIG. 12 is a diagram illustrating an example of a display screen during the moving image capturing.

FIG. 12 illustrates an example of a display screen that displays a guide that gives an instruction to correct the movement of the user according to the display of the display screen in FIG. 11. In FIG. 12, a live view image 1000, a main object 1001, and a guide frame 1002 correspond to the live view image 900, the main object 901, and the guide frame 902, respectively, in FIG. 11. The user instruction unit 208 displays correction text 1003 on the live view image 1000. The correction text 1003 displays a comment that gives an instruction to correct the movement of the user. For example, in a correction instruction "chase object faster", the user instruction unit 208 highlights an arrow 1004 by causing the arrow 1004 to blink, changing the color of the arrow 1004, or changing the size of the arrow 1004. For example, in a correction instruction "include object within frame", the user instruction unit 208 highlights the guide frame 1002 by causing the guide frame 1002 to blink or changing the color of the guide frame 1002 similarly to the arrow 1004. The correction text 1003 and the highlighting of the guide frame 1002 and the arrow 1004 are examples of the correction information that gives an instruction to correct the movement of the user.

In step S808, the image capturing unit 209 ends the moving image capturing. Then, the processing of the during-imaging assistance ends. The processes of steps S800 to S807 are continuously repeated during the moving image capturing. As described above, according to the detection that the motion of a mover according to camerawork is not performed during moving image capturing, the camera instruction unit 207 displays a guide that gives an instruction to correct the motion of the mover. The camera instruction unit 207 not only displays the guide that gives an instruction to correct the motion of the mover, but also controls the operation of the camera main body or the lens to correct a shift from an appropriate operation of the camerawork.

According to the present exemplary embodiment as described above, a user of a camera can be assisted by a guide being displayed that instructs the user to move or perform a camera operation in such a manner that allows the user to perform moving image capturing according to camerawork intended by the user. The user can also be provided with camerawork suitable for capturing a moving image of a currently captured object.

A second exemplary embodiment will be described. In the first exemplary embodiment, the method for determining recommended camerawork according to information regarding an object has been described. In the present exemplary embodiment, a method will be described for determining recommended camerawork taking into account a currently captured scene in information regarding an object. The differences from the first exemplary embodiment are mainly described below, and portions similar to those in the first exemplary embodiment are omitted.

Figure 13:
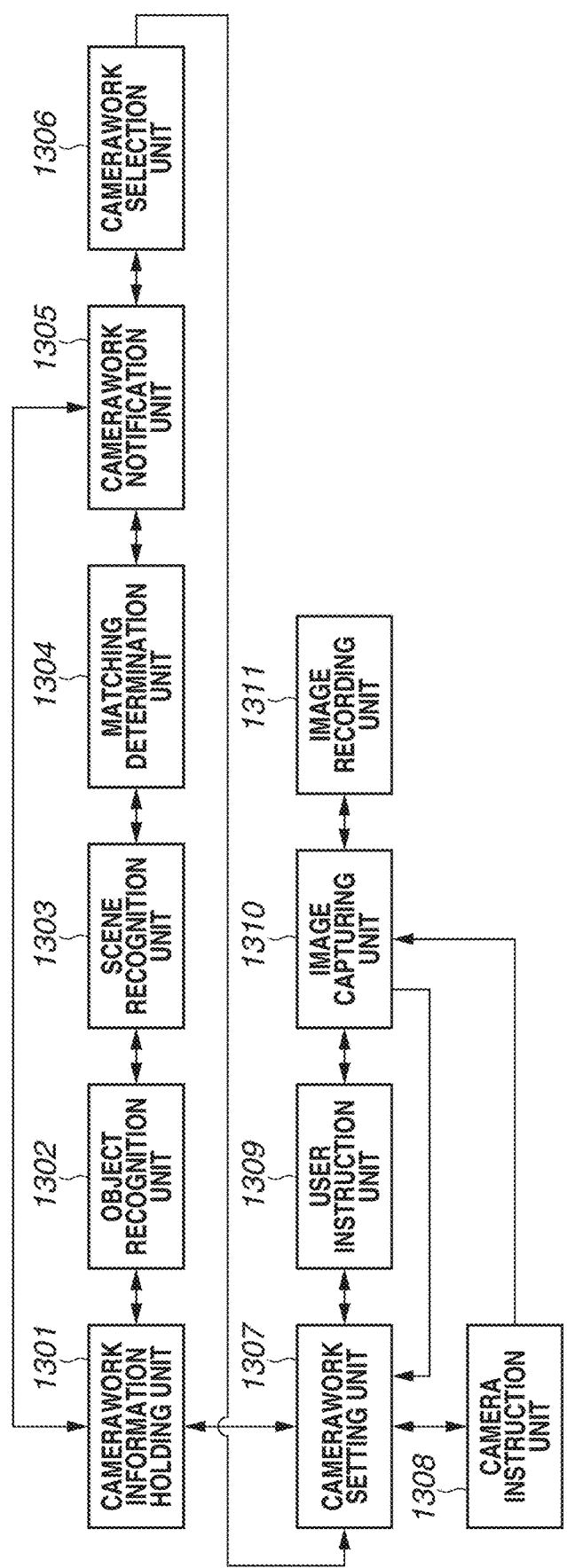
FIG. 13 is a diagram illustrating an example of a functional configuration of a digital camera.
Figure 14C:
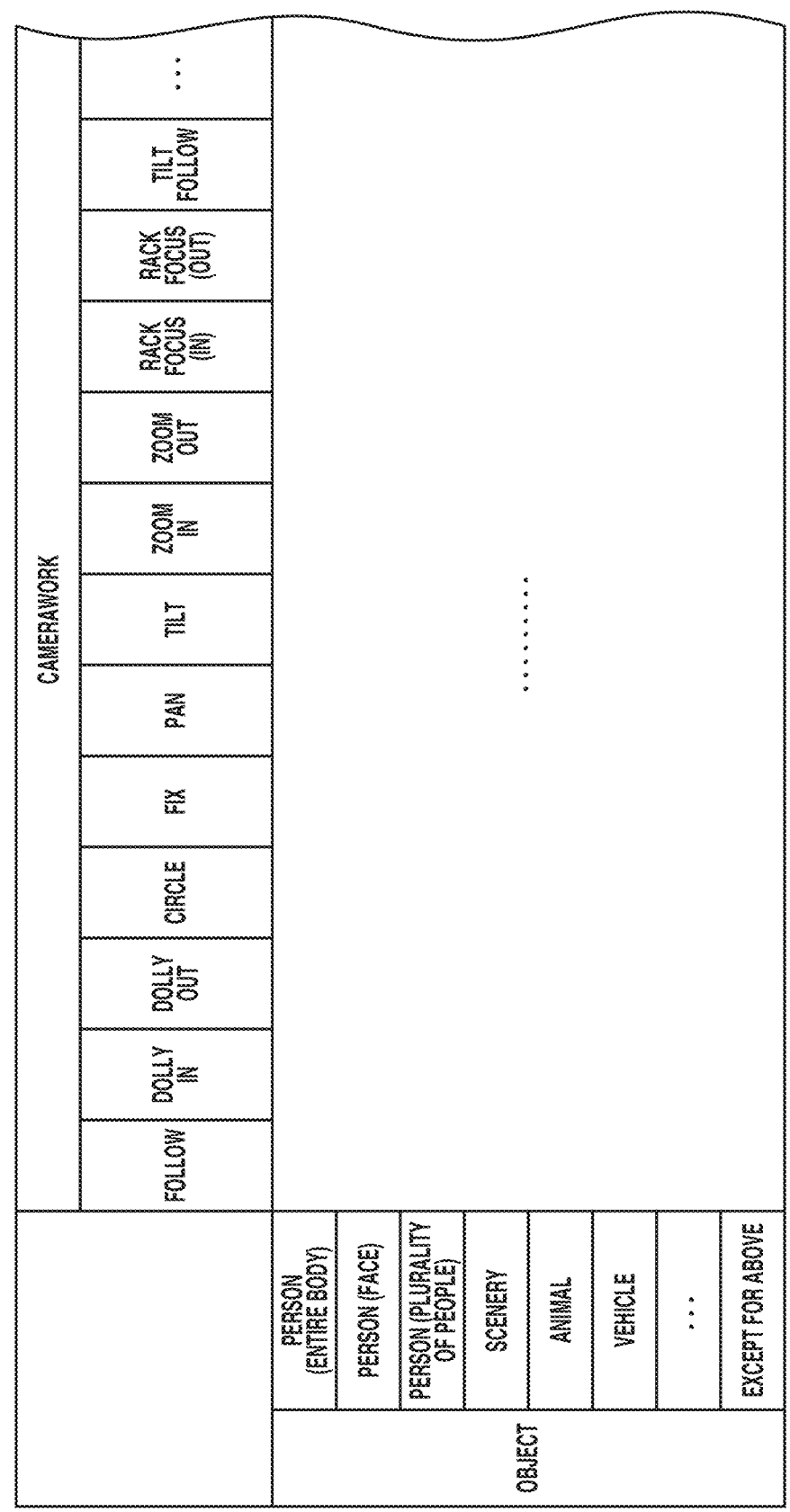

FIG. 13 illustrates a functional configuration of a digital camera 100 according to the present exemplary embodiment. The functional configuration illustrated in FIG. 13 is different from the functional configuration in FIG. 2 in that a scene recognition unit 1303 is provided between an object recognition unit 1302 (equivalent to the object recognition unit 202) and a matching determination unit 1304 (equivalent to the matching determination unit 203). Moreover, the configuration of data held in a camerawork information holding unit 1301 is different from the configuration of data held in the camerawork information holding unit 201 according to the first exemplary embodiment.

FIGS. 14A to 14D illustrate the configuration of data held in the camerawork information holding unit 1301 according to the present exemplary embodiment. As illustrated in FIGS. 14A to 14D, the camerawork information holding unit 1301 holds a data table illustrating the association of pieces of camerawork with the type of each object with respect to each of a plurality of scenes. For example, if an object is "person (entire body)" and a scene is "blue sky", the matching determination unit 1304 determines circle, tilt, zoom out, and tilt follow among the plurality of pieces of camerawork as pieces of recommended camerawork. If there is a plurality of pieces of recommended camerawork, a camerawork notification unit 1305 (equivalent to the camerawork notification unit 204) can give a notification based on pieces of camerawork information alone set in advance by the user so that a notification of the pieces of camerawork information is given as pieces of recommended camerawork information.

The scene recognition unit 1303 analyzes currently captured moving image data and recognizes a scene as an imaging target. Specifically, the scene recognition unit 1303 recognizes the type of the scene using information including the color distribution and the exposure distribution, in an image obtained from the moving image data and information regarding changes over time in the color distribution and the exposure distribution. Examples of the type of the scene recognized by the scene recognition unit 1303 include bright, dark, a blue sky, an evening view, and a spotlight.

The matching determination unit 1304 compares the information regarding the object acquired by the object recognition unit 1302 and the type of the scene recognized by the scene recognition unit 1303 and the pieces of information associated with the pieces of camerawork information held in the camerawork information holding unit 201. Then, as a result of the comparison, the matching determination unit 1304 determines whether there are pieces of camerawork information that match the information regarding the object acquired by the object recognition unit 1302 and the type of the scene recognized by the scene recognition unit 1303.

Figure 15:
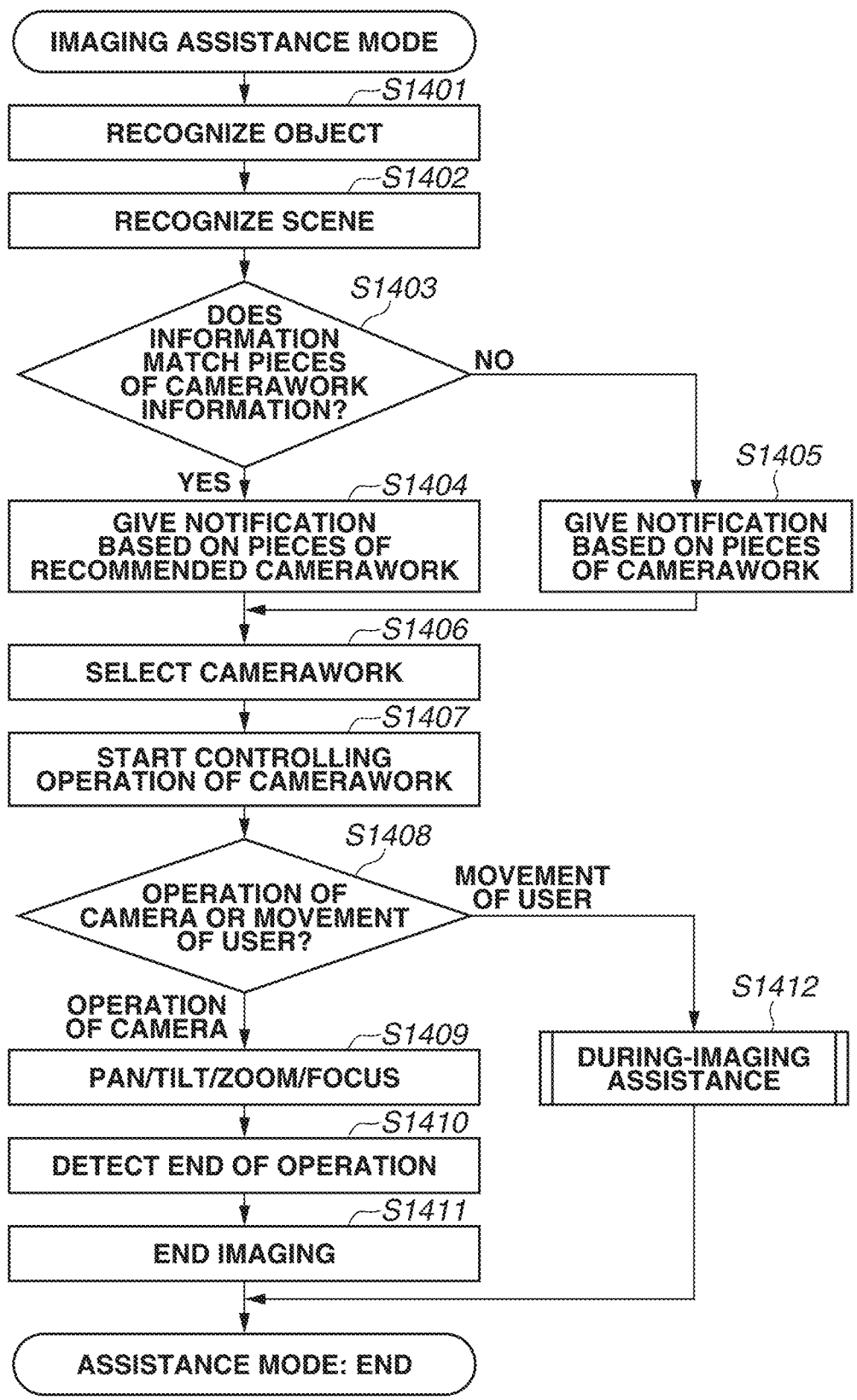
FIG. 15 is a flowchart illustrating processing executed in an imaging assistance mode.

FIG. 15 illustrates the processing flow of the imaging assistance mode according to the present exemplary embodiment.

Steps S1401 and S1403 to S1412 in the processing flow illustrated in FIG. 15 are similar to steps S701 to S711 in the processing flow in FIG. 9. That is, the processing flow of the imaging assistance mode according to the present exemplary embodiment is obtained by adding a scene recognition step (step S1402) to the processing flow of the imaging assistance mode according to the first exemplary embodiment.

In step S1402, the scene recognition unit 1303 analyzes the currently captured moving image data to recognize a scene.

In step S1403, based on the information regarding the object and the result of the recognition of the scene acquired in steps S1401 and S1402, the matching determination unit 203 determines pieces of recommended camerawork. The following processing steps are similar to those in the first exemplary embodiment except for the processing of during-imaging assistance (step S1412).

Figure 16:
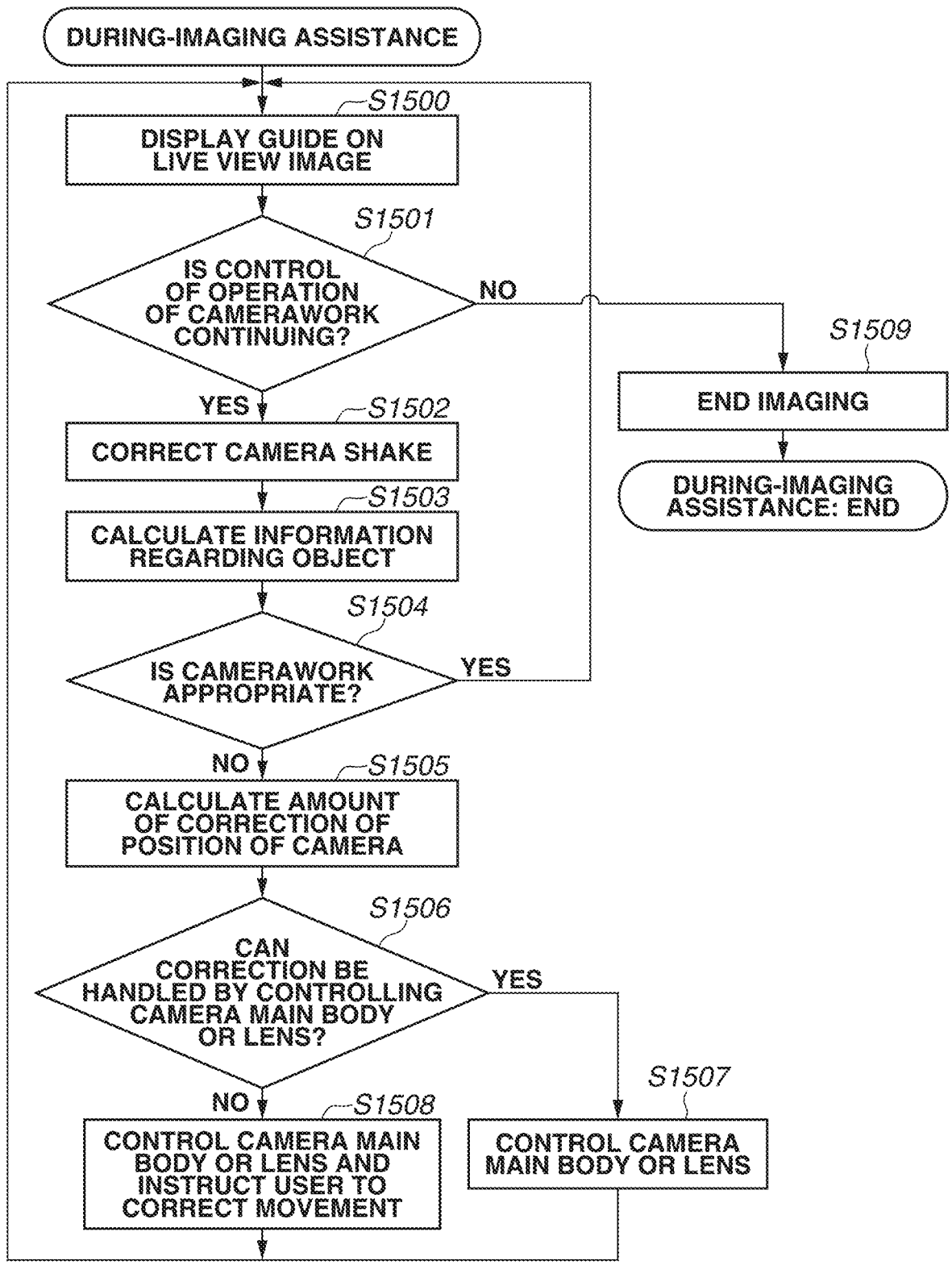
FIG. 16 is a flowchart illustrating details of processing of during-imaging assistance.

FIG. 16 illustrates the processing flow of the during-imaging assistance according to the present exemplary embodiment. The processing flow of the during-imaging assistance corresponds to the process executed in step S1412 in FIG. 15. Steps S1500, S1501, and S1503 to S1509 in the processing flow illustrated in FIG. 16 are similar to steps S800 to S808 in the processing flow in FIG. 10. That is, the processing flow of the during-imaging assistance according to the present exemplary embodiment is obtained by adding a camera shake correction step (step S1502) to the processing flow of the during-imaging assistance according to the first exemplary embodiment.

In step S1502, the camera instruction unit 207 receives signals from the acceleration sensor and the angular velocity sensor included in the camera control unit 108 and corrects the position and orientation of the camera main body by changing the position and orientation of the camera main body to cancel out changes in the position and orientation of the camera main body. Thus, when the amount of correction of the camera is calculated in step S1505 at a subsequent stage, it is possible to more actively correct the influence of camera shake caused by the user or small blur associated with the movement of the user on a captured moving image.

In the present exemplary embodiment as described above, camerawork according to the scene can be recommended.

Further, moving image capturing can be performed by appropriately correcting blur in a camera during the moving image capturing.

According to the present disclosure, an imaging device can be provided that assists a user of a camera in performing moving image capturing with appropriate camerawork, and a control method for controlling the imaging device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-108615, filed Jun. 30, 2023, which is hereby incorporated by reference herein in its entirety.

What is claimed is:

1. An imaging device comprising:
one or more memories; and
one or more processors in communication with the one or more memories, wherein execution of the stored instructions configures the one or more processors to:
capture an image;
display a live view image obtained by capturing the image on a display; and
in a case where a piece of camerawork used to capture a moving image is selected from among a plurality of pieces of camerawork indicating imaging methods for capturing a moving image, then based on attribute information regarding the selected piece of camerawork, perform control to display on the display a guide that instructs a user to move the imaging device according to a motion associated with the selected piece of camerawork.

2. The imaging device according to claim 1, wherein execution of the one or more instructions further configures the one or more processors to:
acquire information regarding an object from the captured image during the capturing of the moving image; and
update the display of the guide based on attribute information regarding the selected piece of camerawork and the acquired information regarding the object.

3. The imaging device according to claim 1, wherein execution of the one or more instructions further configures to:
acquire information regarding an object from the captured image during the capturing of the moving image; and in a case where a shift from the motion according to the selected piece of camerawork is detected based on attribute information regarding the selected piece of camerawork and the acquired information regarding the object, perform control to display, on the display, correction information that instructs the user to move the imaging device to correct the motion.

4. The imaging device according to claim 1, wherein execution of the one or more instructions further configures the one or more processors to:
    acquire information regarding an object from the captured image during the capturing of the moving image; and
    in a case where a shift from the motion according to the selected piece of camerawork is detected based on attribute information regarding the selected piece of camerawork and the acquired information regarding the object, control an operation of an imaging device main body or a lens.

5. The imaging device according to claim 1, wherein execution of the one or more instructions further configures the one or more processors to:
    based on information regarding an object recognized from the captured image during the capturing of the moving image, determine pieces of recommended camerawork from among the plurality of pieces of camerawork indicating the imaging methods for capturing a moving image; and
    provide a notification of the determined pieces of camerawork.

6. The imaging device according to claim 5, wherein a piece of camerawork used to capture the moving image is selected from among the pieces of camerawork of which the notification is provided.

7. The imaging device according to claim 5, wherein based on a scene recognized from the captured image during the capturing of the moving image, the pieces of recommended camerawork are determined from among the plurality of pieces of camerawork.

8. The imaging device according to claim 1, wherein the attribute information includes a composition and a moving direction and a moving velocity of the imaging device during the capturing of the moving image.

9. The imaging device according to claim 1, wherein execution of the one or more instructions further configures the one or more processors to:
    acquire information regarding an object from the captured image during the capturing of the moving image; and
    in a case where a shift from the motion according to the selected piece of camerawork is detected based on attribute information regarding the selected piece of camerawork and the acquired information regarding the object, calculate an amount of correction of an imaging device main body or a lens for capturing the moving image according to the selected piece of camerawork.

10. The imaging device according to claim 9, wherein based on the amount of correction, control is performed to change a position and orientation of the imaging device main body by controlling a driving device of the imaging device main body to correct a position of the object in the live view image.

11. The imaging device according to claim 9, wherein based on the amount of correction, control is performed to change an enlargement ratio of the lens to correct a size of the object in the live view image.

12. The imaging device according to claim 9, wherein based on the amount of correction, control is performed to display correction information that instructs the user, on the display, to move such that motion is corrected.

13. The imaging device according to claim 1, wherein the guide is information indicating at least any one of a position and a size of an object in the live view image and a moving direction and a moving velocity of an imaging device main body to the user.

14. The imaging device according to claim 1, wherein the piece of camerawork is an imaging method in which the user captures a moving image while moving by holding a camera main body.

15. A control method for controlling an imaging device, the control method comprising:
    capturing an image;
    displaying a live view image obtained by capturing the image on a display; and
    in a case where a piece of camerawork used to capture a moving image is selected from among a plurality of pieces of camerawork indicating imaging methods for capturing a moving image, then based on attribute information regarding the selected piece of camerawork, performing control to display on the display a guide that instructs a user to make a motion according to the selected piece of camerawork.

16. A non-transitory computer-readable storage medium storing a program that when executed by one or more processors of a computer, execute a control method for controlling an imaging device, the control method comprising:
    capturing an image;
    displaying a live view image obtained by capturing the image on a display; and
    in a case where a piece of camerawork used to capture a moving image is selected from among a plurality of pieces of camerawork indicating imaging methods for capturing a moving image, then based on attribute information regarding the selected piece of camerawork, performing control to display on the display a guide that instructs a user to make a motion according to the selected piece of camerawork.

* * * * *